(12) United States Patent
Raasakka et al.

(10) Patent No.: US 10,690,779 B2
(45) Date of Patent: Jun. 23, 2020

(54) SIDE PEAK TRACKING DETECTION (71) Applicant: Honeywell International Inc., Morris Plains, NJ (US)

(72) Inventors: Jussi Raasakka, Brno (CZ); Martin Orejas, Brno (CZ); Tomas Hynek, Kutna Hora (CZ); Jakub Skalicky, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 407 days.

(21) Appl. No.: 15/622,884

(22) Filed: Jun. 14, 2017

(65) Prior Publication Data

US 2018/0364363 A1 Dec. 20, 2018

(51) Int. Cl.
*G01S 19/30* (2010.01)
*H04B 1/7075* (2011.01)
*H04B 1/7097* (2011.01)
*H04B 1/707* (2011.01)
*G01S 19/29* (2010.01)

(52) U.S. Cl.
CPC ............ *G01S 19/30* (2013.01); *H04B 1/7097* (2013.01); *H04B 1/70751* (2013.01); *G01S 19/29* (2013.01); *H04B 2001/70706* (2013.01)

(58) Field of Classification Search
CPC ..... G01S 19/30; H04B 1/692; H04B 1/70751; H04B 1/70756; H04B 2001/70706; H04B 1/69
See application file for complete search history.

(56) References Cited

U.S. PATENT DOCUMENTS 6,922,167 B2    7/2005  Gerein
8,942,157 B2 *  1/2015  Keegan ................. G01S 19/30
                                                         370/313
(Continued)

OTHER PUBLICATIONS

Carvalho et al., "Modulation for Digital Radio Broadcasting Using Amplitude Autocorrelation of Pseudo Random Noise Codes to Carry Information", "SciRes. Communications and Network, 2013", Sep. 2013, pp. 57-64, Publisher: Departamento de Telecomunicaes, Instituto Tecnolgico de Aeronutica, So Jos dos Campos, Brazil.

(Continued)

*Primary Examiner* — Gregory C. Issing
(74) *Attorney, Agent, or Firm* — Fogg & Powers LLC (57) ABSTRACT

A baseband tracking channel in a GNSS receiver is provided. The baseband tracking channel comprises: a code generator to generate a local signal correlating with an incoming signal received by the GNSS receiver; a multiplier that multiplies the local signal with a baseband signal corresponding to an incoming signal received by the GNSS receiver to generate a code removed signal; a prompt correlator including at least one integration register that integrates samples of the code removed signal corresponding to a first portion of each pseudorandom noise code chip of the code removed signal to provide a first integration register output, and integrates samples corresponding to a second portion of each PRN code chip to provide a second integration register output; and a side peak tracking detection module that generates information indicating when side peak tracking is occurring based on the first integration register output and the second integration register output.

20 Claims, 5 Drawing Sheets

(56) References Cited

U.S. PATENT DOCUMENTS

| | | | |
|---|---|---|---|
| 8,964,813 B2 | 2/2015 | Hodgart et al. | |
| 9,813,108 B2* | 11/2017 | Chae | H04B 1/7085 |
| 9,817,128 B2* | 11/2017 | Lee | G01S 19/01 |
| 2005/0270997 A1 | 12/2005 | Julien et al. | |
| 2009/0027261 A1* | 1/2009 | Martin | G01S 19/07 342/357.44 |
| 2009/0207891 A1* | 8/2009 | Pon | G01S 19/22 375/150 |

OTHER PUBLICATIONS

Julien et al., "A New Unambiguous BOC(n,n) Signal Tracking Technique", "GNSS 2004, European Navigation Conference; https://hal-enac.archives-ouvertes.fr/hal-01021725", May 2004, pp. i-12, vol. hal-01021725, Publisher: Archives-Ouvertes.fr, Published in: Rotterdam, Netherlands.

Ward, "Satellite Signal Acquisition, Tracking, and Data Demodulation", "Understanding GPS Principles and Applications 2nd Ed.", 2006, pp. 153-241, No. Chapter 5, Publisher: The Mitre Corporation.

Wang et al., "A New Unambiguous Acquisition Algorithm for BOC(N,N) Signals", "School of Information and Electronics, Beijing Institute of Technology, ICSP2014 Proceedings", 2014, pp. 94-97, Publisher: IEEE.

Anantharamu et al., "Pre-Filtering, Side-Peak Rejection and Mapping: Several Solutions for Unambiguous BOC Tracking", Department of Geomatics Engineering, University of Calgary, 22nd International Meeting of the Satellite Division of the Institute of Navigation, Sep. 22-25, 2009, pp. 3142-3155, Published: Savannah, GA.

European Patent Office, "Extended European Search Report from EP Application No. 18175860.8 dated Nov. 14, 2018", "from Foreign Counterpart of U.S. Appl. No. 15/622,884", Nov. 14, 2018, p. 1-8, Published in: EP.

Wendel et al., "A Robust Technique for Unambiguous BOC Tracking" Proceeding of the 26th International Technical Meeting of the ION Satellite Division, ION GNS+, Sep. 16-20, 2013, p. 3536-3547, Published: Nashville, TN.

\* cited by examiner

SIDE PEAK TRACKING DETECTION

BACKGROUND

In conventional systems, Global Navigation Satellite System (GNSS) signals are employing new modulation techniques to increase the overall system performance. However, these modulations introduce multiple peaks to the autocorrelation function. This can cause a receiver to track a wrong peak of the autocorrelation function resulting in biased pseudorange measurements.

For example, in conventional systems, the incoming signal may have multiple peaks in its autocorrelation function. Typically, in order to reduce the complexity of the receiver, this signal is being tracked by correlating the incoming signal with a locally generated binary offset carrier (BOC) signal replica. This incoming signal may be a composite binary offset carrier (CBOC) or any other complex BOC signal. The cross-correlation function of the BOC signal shows two side peaks located at a given offset (for example, ±0.5 chips) from the center peak. The receiver can lock to these side peaks unless some protection mechanism is utilized to prevent side peak tracking.

Conventionally, the baseband channel in the GNSS receiver responsible for tracking BOC modulated signals includes five correlators: Very Early, Early, Prompt, Late, and Very Late. The Prompt correlator is responsible for tracking the center peak and the Very Early and the Very Late correlators are spaced at ±0.5 chip distance apart from the Prompt correlator. If a side peak is tracked, it can be detected by observing a higher amplitude in either of the two correlators with respect to the prompt correlator. If the amplitude in one of these two correlators is larger than the amplitude of the prompt correlator for several integration periods, it is concluded that the receiver is tracking a side peak of the signal and the local signal replica is moved by the given offset. This is known as the bump jumping technique. However, the inclusion and use of the Very Early and Very Late Correlators in the conventional bump jumping technique leads to an increased complexity in the baseband tracking channel design, thus, increasing the cost of the GNSS receiver.

For the reasons stated above and for other reasons stated below, it will become apparent to those skilled in the art upon reading and understanding the specification, there is a need in the art for a less complex baseband tracking channel design with fewer correlators to detect side peak tracking in the baseband tracking channel.

SUMMARY

A global navigation satellite system (GNSS) receiver having at least one processor configured to implement at least one baseband tracking channel is provided. The baseband tracking channel comprises: at least one code generator to generate a local signal correlating with an incoming signal received by the GNSS receiver; a multiplier that multiplies the local signal with a baseband signal corresponding to an incoming signal received by the GNSS receiver to generate a code removed signal; at least one prompt correlator including at least two integration registers, wherein a first of the at least two integration registers integrates the samples of the code removed signal corresponding to a first portion of each pseudorandom noise (PRN) code chip of the local signal to provide a first integration register output, and wherein a second of the at least two integration registers integrates the samples of the code removed signal corresponding to a second portion of the PRN code chip of the local signal to provide a second integration register output; and a side peak tracking detection module that receives integration results from the at least first and second of the at least two integration registers and generates information indicating when side peak tracking is occurring based on the integration results from the at least first and second of the at least two integration registers.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present description provide systems and methods for detecting side peak tracking in a baseband tracking channel of a GNSS receiver. Specifically, a prompt correlator including a plurality of integrators allow integration of the local signal to be divided into different parts such that each part of the pseudorandom noise (PRN) code chip of the local signal is integrated in one of the plurality of integrators, and a side peak tracking detection module generates information indicating when side peak tracking is occurring based on the integration results from the plurality of integrators. If side peak tracking is detected, the receiver can be adjusted to shift the prompt correlator offset and the receiver can be prevented from locking to side peak tracking.

Figure 1:
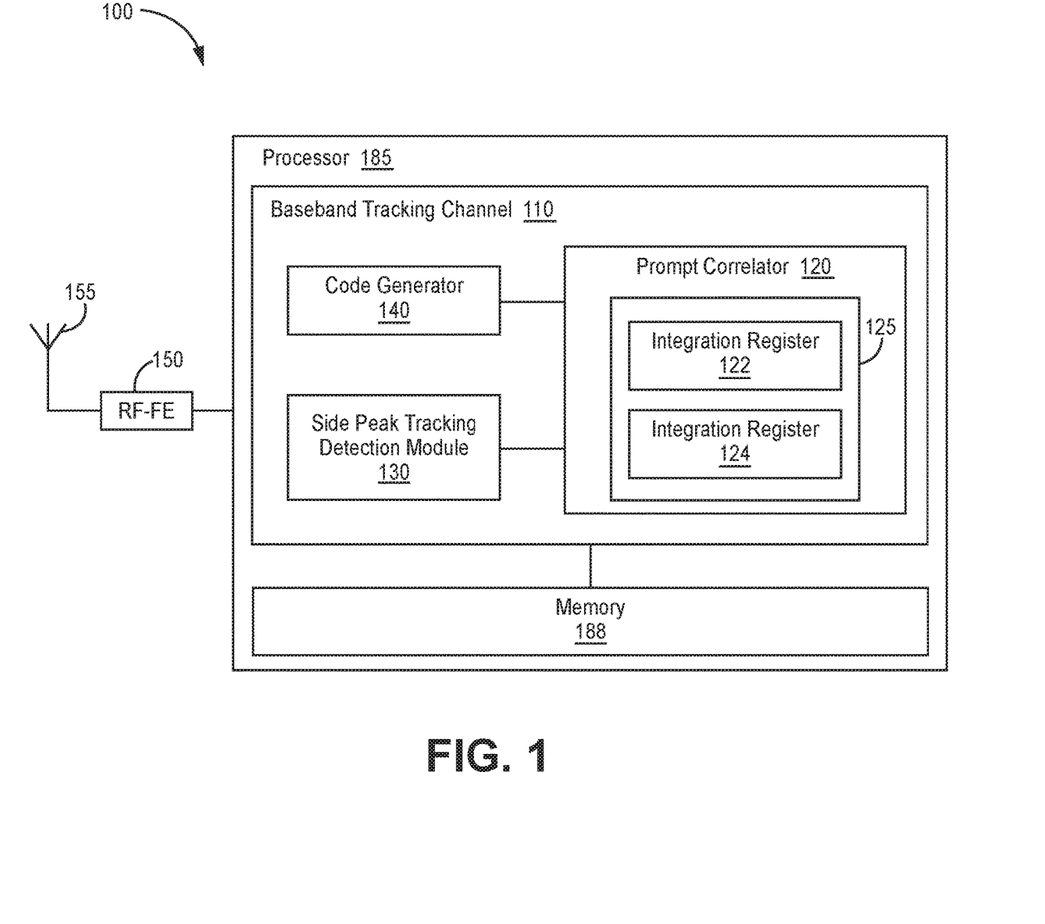
FIG. 1 is a block diagram of an example GNSS receiver according to one embodiment of the present disclosure.

FIG. 1 is a block diagram of an example GNSS receiver 100 for one embodiment of the present disclosure. GNSS receiver 100 includes or is coupled to at least one antenna 155 that receives an incoming GNSS signal, at least one radio frequency front end (RF-FE) 150 and a processor 185 that processes the digitized samples output by RF-FE 150.

At least one GNSS signal is received by the GNSS receiver 100 through antenna 155 and fed into RF-FE 150. The GNSS signal received by the GNSS receiver 100 may include noise and/or interference in the signal. In exemplary embodiments, RF-FE 150 down-converts and digitizes the received GNSS signal into digitized samples. The digitized samples of the received GNSS signal are then received by the at least one processor 185.

In exemplary embodiments, the at least one processor 185 implements at least some of the processing described herein. In exemplary embodiments, the at least one processor 185 includes at least one programmable processor, such as a microprocessor, a microcontroller, an application-specific integrated circuit (ASIC), a field-programmable gate array (FPGA), a field programmable object array (FPOA), or a programmable logic device (PLD). In exemplary embodiments, the at least one processor 185 can be any other suitable processor (such as, digital signal processor (DSP), etc.) The at least one processor 185 described above may include or function with software programs, firmware or other computer readable instructions for carrying out various methods, process tasks, calculations, and control functions, described herein.

These instructions, and the data used and generated by the processor 185, are typically stored on any appropriate computer readable medium used for storage of computer readable instructions or data structures, such as memory 188. The computer readable medium can be implemented as any available non-transient and tangible media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or nonvolatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

The at least one processor 185 implements at least one baseband tracking channel 110. As shown in FIG. 1, baseband tracking channel 110 includes at least one code generator 140 that is coupled to at least one prompt correlator 120. In exemplary embodiments, prompt correlator 120 includes at least two integration registers 122 and 124. The code removed signal is generated by multiplier 166 by multiplication of carrier removed incoming signal produced by multiplier 162 with local PRN code signal modulated also with a BOC signal generated by code generator 140. This code removed signal is split, such that samples corresponding to one portion of each chip of the PRN code modulated with a BOC signal generated by the code generator 140 is received by the first integration register 122 and samples corresponding to a second portion of each chip of the PRN code modulated with a BOC signal generated by the code generator 140 is received by the second integration register 124. In one implementation, the first portion is the first half of each chip of the PRN code modulated with a BOC signal and the second portion is the second half of each chip of the PRN code modulated with a BOC signal. In one implementation, the first and the second portion are determined by BOC chip signal (control signal) locally generated by code generator 140.

In exemplary embodiments, integration registers 122 and 124 are implemented by a single integration register 125. In such an example, a single integration register 125 performs the function of both integration registers 122 and 124. That is, the code signal generated by code generator 140 is received by integration register 125, wherein integration register 125 integrates in an additive mode for samples of code removed signal corresponding to a first portion of each chip of the local PRN code modulated with the BOC signal and integrates in a subtractive mode for samples of code removed signal corresponding to a second portion of each chip of the local PRN code modulated with the BOC signal. Accordingly, integration register 125 is configured to switch between the additive mode and subtractive mode of integration register 125 based on the portion of the chip that samples being integrated correspond to. In exemplary embodiments, this switching between modes is controlled by a BOC chip signal generated by code generator 140.

The prompt correlator 120 is further coupled with a side peak tracking detection module 130 that receives the outputs from the first integration register 122 and the second integration register 124. In some implementations, the side peak tracking detection module 130 is coupled with code generator 140. In some implementations, the baseband tracking channel is coupled to memory 188. In some implementations, memory 188 is included in processor 185.

Figure 2:
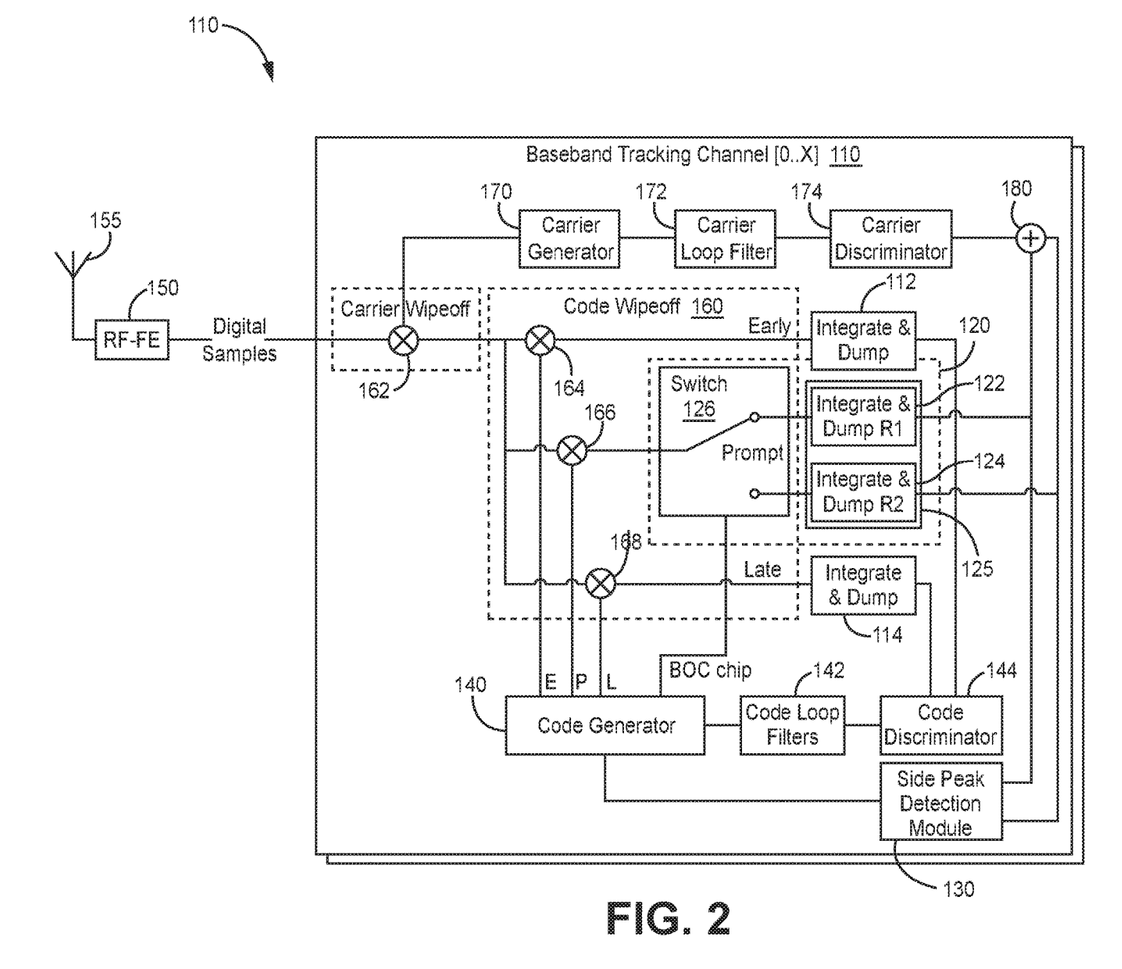
FIG. 2 is a block diagram of an example baseband tracking channel included in GNSS receiver of FIG. 1 according to one embodiment of the present disclosure.

As illustrated in FIG. 2, baseband tracking channel 110 includes a carrier generator 170 that generates a local carrier signal, which is an estimate of the remaining intermediate frequency and Doppler frequency of the incoming GNSS signal. The digitized samples of the incoming GNSS signal are converted into baseband by multiplying the local signal with the incoming signal using multiplier 162.

Baseband tracking channel 110 further includes a code generator 140 that generates at least one local pseudorandom noise code signal to correlate with the incoming signal. The product of the baseband signal output from multiplier 162 and at least one local PRN code signal is then integrated for correlation. In the example shown in FIG. 1, three PRN code signals are generated by the code generator for correlation: Early, Prompt, and Late.

The product of the baseband signal with Early PRN code signal (shown in FIG. 2 at 164) is sent into integration and dump filter 112 and the product of baseband signal with Late PRN code signal (shown in FIG. 2 at 168) is sent into integration and dump filter 114. The output of integration and dump filters 112 and 114 are numerical values indicating how much the PRN code signal correlates with the code in the incoming signal.

The product 166 of the baseband signal and the prompt PRN code signal, is a code removed signal and is received by a switch 126 included in baseband tracking channel 110. In exemplary embodiments, switch 126 is a binary offset carrier (BOC) switch. Baseband tracking channel 110 further includes at least two integration registers 122 and 124. Switch 126 facilitates code removed signal to be divided into two parts, wherein one part of each PRN chip of the code removed signal is integrated by integration register 122 and a second part of each PRN chip of the code removed signal is integrated by integration register 124. The switching between registers 122 and 124 is controlled via a control signal generated by code generator 140. In one implementation, the control signal is a BOC chip signal. In the example shown in FIG. 2, the code removed signal is output from multiplier 166 after the BOC modulated PRN code signal generated by code generator 140 has been multiplied by the baseband signal output from multiplier 162.

A BOC chip is a signal indicating whether the current PRN sequence sample is modulated by a value of either +1 or −1. In BOC (1,1) modulation, each chip in the PRN sequence is divided into two parts. One part of the chip is multiplied with +1 and the second part of the chip is multiplied with −1. As shown in FIG. 2, the BOC chip signal generated by code generator 140 indicates the current modulation of the locally generated PRN code signal, wherein the samples corresponding to first portion of the chip (multiplied by 1) are integrated by integration register 122 and the samples corresponding to second portion of the chip (multiplied by −1) are integrated by integration register 124. Accordingly, this BOC chip signal controls switch 126 to determine whether the code removed signal is accumulated by first integration register 122 or second integration register 124.

Multiplication of the first portion of each chip of the local PRN code modulated with the BOC signal and the second portion of each chip of the local PRN code modulated with the BOC signal depends on the value of the PRN chip. In exemplary embodiments, samples of code removed signal corresponding to first portion of each chip of the local PRN code modulated with the BOC signal is multiplied by 1, and samples of code removed signal corresponding to a second portion of each chip of the local PRN code modulated with the BOC signal is multiplied by −1. In exemplary embodiments when the value of PRN code chip is −1, samples of code removed signal corresponding to first portion of each chip of the local PRN code modulated with the BOC signal is multiplied by 1, and samples of code removed signal corresponding to a second portion of each chip of the local PRN code modulated with the BOC signal is multiplied by −1. Samples corresponding to the first portion are integrated by integration register 122 and samples corresponding to the second portion are integrated by integration register 124.

A comparison of the output from the first integration register 122 and second integration register 124 provides a result indicating whether side peak tracking is occurring. In exemplary embodiments, a first result is obtained by subtraction of integrated samples corresponding to the first portion and integrated samples corresponding to the second portion of each chip of local PRN code modulated with the BOC signal. In exemplary embodiments this result is normalized. When GNSS receiver 100 is tracking a main peak the subtraction result is close to zero. However, when tracking channel 110 is tracking a side peak, the normalized subtraction result between the integrated samples corresponding to the first portion and the integrated samples corresponding to the second of each chip is close to an offset value consistent with code offset between a side peak and a main peak tracked by the tracking channel 110. Accordingly, in exemplary embodiments, side peak tracking can be detected by subtracting the integrated samples corresponding to the second portion of each chip of local PRN code modulated with the BOC signal from the integrated samples corresponding to the first portion of each chip of local PRN code modulated with the BOC signal.

Integration registers 122 and 124 output numerical values that indicate correlation between the PRN code signal and the code in the incoming GNSS signal. In some implementations, the output of the integration registers 122 and 124 are sent to a summing node 180. The sum of the integration registers 122 and 124 provide a correlation result of the prompt correlator 120. That is, the sum of integration register 122 and 124 provides a result indicating the correlation between the PRN code signal of the prompt correlator 120 and the code in the incoming GNSS signal.

In some implementations, the output from the summing node 180 is then fed back through a carrier tracking loop where the output is received by a carrier discriminator 174, which is then sent to a carrier loop filter 172 before being received by the carrier generator 170. Similarly, outputs from integrate and dump filters 112 and 114 go through a code tracking loop where the output is received by a code discriminator 144, which is then sent to a code loop filter 142 before being received by the code generator 140.

The output of the integration registers 122 and 124 are also sent to the side peak tracking detection module 130 to detect when tracking channel 110 is tracking a side peak in the correlation function. In some implementations, side peak tracking detection module is coupled to code generator 140 and the information indicating when side peak tracking is occurring is provided to code generator 140.

Figure 3:
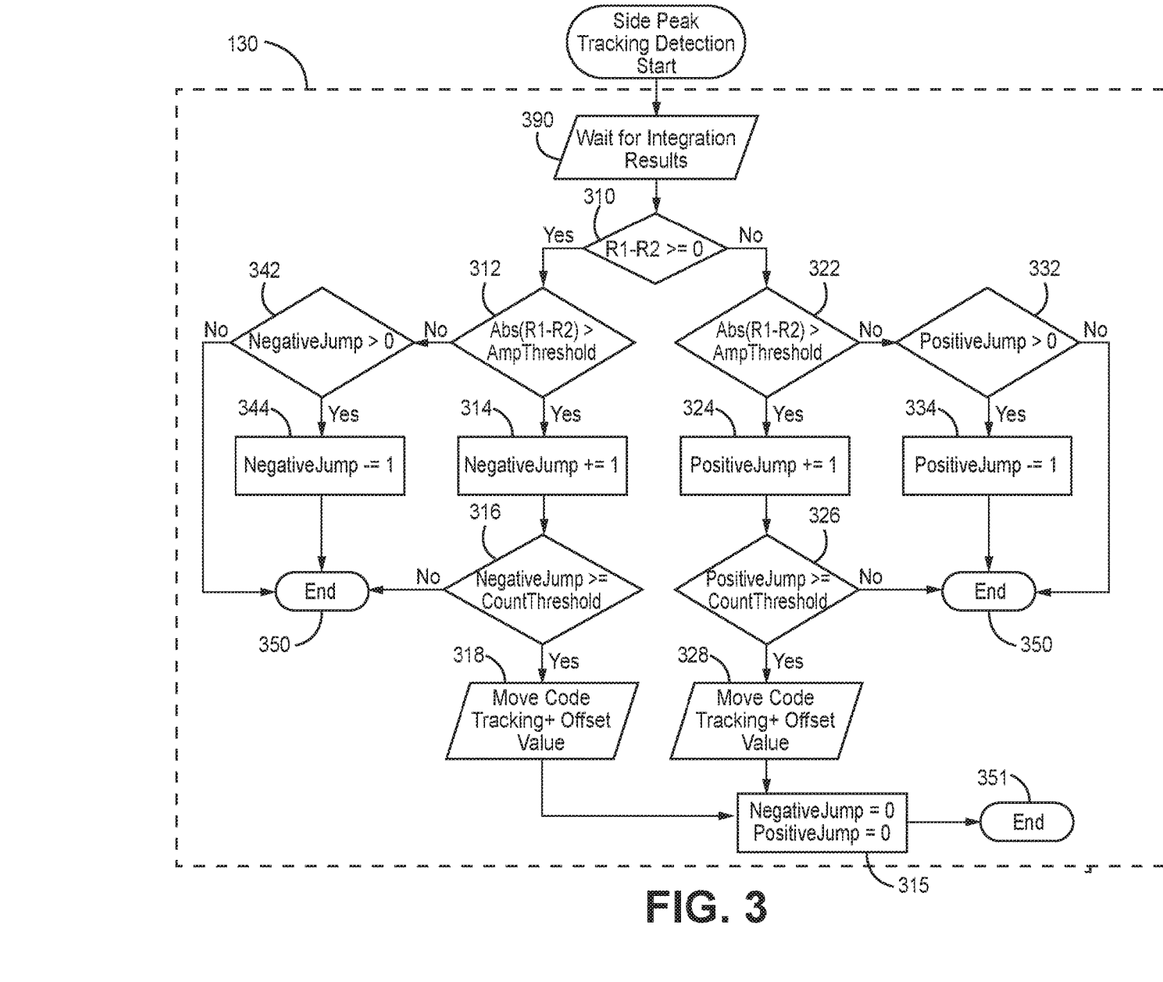
FIG. 3 is a flow diagram of an example side peak tracking detection module included in baseband tracking channel according to one embodiment of the present disclosure.

FIG. 3 shows a flow diagram of one example embodiment of a process for side peak tracking detection which may be implemented by the side peak tracking detection module 130 in tracking channel 110. It should be understood that process shown in FIG. 3 may be implemented in conjunction with any of the various embodiments and implementations described in this disclosure above or below. As such, elements of this process may be used in conjunction with, in combination with, or substituted for elements of those embodiments. Further, the functions, structures and other description of elements for such embodiments described herein may apply to like named elements of this method and vice versa.

In the example shown in FIG. 3, the side peak tracking detection module 130 receives the first integration register output R1 from the first integration register 122 and a second integration register output R2 from the second integration register 124. The first integration register output R1 is compared with the second integration register output R2 and an absolute value of the comparison result is determined. In the example shown in FIG. 3, the comparison result is a difference between R1 and R2. That is, the second integration output R2 is subtracted from the first integration output R1 to provide a difference (310). The difference, R1-R2, is also referred to herein as subtraction result.

As shown in FIG. 3, side peak tracking detection module 130 is further configured to determine the absolute value of the difference and compare the absolute value with an amplitude threshold (312, 322). In some implementations, the amplitude threshold is predetermined. In some implementations, the amplitude threshold can be stored in a memory such as memory 188 and is accessed by the side peak tracking module 130 during implementation When the absolute value of the difference exceeds an amplitude threshold, the side peak tracking detection module 130 increases a jump count by one (314, 324). When the absolute value of the difference does not exceed the threshold, the jump count is decreased by one. Thus, as discussed below, jump count is the number of time the absolute value of the difference has exceeded the amplitude threshold minus the number of time the absolute value has not exceeded the amplitude threshold. The jump count has a minimum value of zero. As shown in FIG. 3, when the difference of the second integration register output subtracted from the first integration register output is less than zero, the jump count is defined as positive jump (324, 326, 332, 334). Similarly, when the difference of the second integration register output subtracted from the first integration register output is greater than or equal to zero, the jump count is defined as negative jump (314, 316, 342, 344).

The jump count is then compared with a predefined count threshold (316, 326). When the jump count is greater than or equal to count threshold, the side peak tracking detection module can determine that side peak tracking is occurring. Thus, the count threshold is the value that the jump count needs to be greater than or equal to for the side peak tracking detection module to determine that side peak tracking is occurring. When the jump count is less than the count threshold, detection for the integration period is ended (350) and side peak tracking detection module waits for integration results for a subsequent integration period.

When the side peak tracking detection module 130 receives the first integration register output R1 and a second integration register output R2 for a subsequent period, it performs the detection for the subsequent period. If the absolute value of the difference (R1−R2) for the subsequent period exceeds the amplitude threshold, the jump count is increased by one and compared to the count threshold.

When the jump count is greater than or equal to the count threshold, the side peak tracking detection module 130 generates information indicating that the side peak tracking is occurring. In some implementations, information indicating detection of side peak tracking is provided to code generator 140 so that the code generator is shifted by a given offset value.

When the jump count is at least equal to the count threshold, it can be determined that tracking channel 110 is locked on to that side peak. The code generator 140 has to be shifted by a given offset value so that the prompt correlator is located at the main peak and the tracking channel 110 can track the main peak for subsequent integration period(s).

As shown in FIG. 3, when the jump count is greater than or equal to the count threshold, side peak tracking detection module 130 determines that the local PRN code signal is to be shifted by an offset value (318, 328). The offset value is consistent with a code offset between detected side peak and the main peak. In some implementations, the offset value is defined by BOC modulation of the locally generated PRN code signal. In some implementations, the offset value is ±0.5 chips.

When the difference of the second integration register output subtracted from the first integration register output is less than zero by a value larger than the amplitude threshold for at least a number of times equal to the count threshold, the offset value is positive and code register 140 is to be shifted by the positive offset value (328). When the difference of the second integration register output subtracted from the first integration register output is greater than zero by a value larger than the amplitude threshold for at least a number of times equal to the count threshold, the offset value is negative and code register 140 is to be shifted by negative offset value (318). The jump count, both positive jump and negative jump, are set to zero (315) and detection of side peak tracking is restarted (351).

When the absolute value of the difference is less than or equal to an amplitude threshold, the side peak tracking detection module 130 is configured to determine if the jump count is greater than zero (342, 332). When the absolute value of the difference is less than or equal to an amplitude threshold, and the jump count is greater than zero, the side peak tracking detection module 130 has detected side peak tracking for at least one previous iteration. In such an example, the jump count is decreased by one (344, 334) and the detection for the integration period has ended (350). Accordingly, the jump count is the number of times the absolute value of the difference has exceeded the amplitude threshold minus the number of time the absolute value of the difference has not exceeded the amplitude threshold. In some implementations, the jump count can be stored in a memory such as memory 188 for later retrieval in subsequent iterations.

When the absolute value of the difference is less than or equal to an amplitude threshold or when the jump count is less than the count threshold the tracking channel 110 is assumed to be tracking the main peak. Accordingly, the side peak tracking detection module 130 is configured to end (350). In some implementations, the side peak tracking detection module 130 generates information that main peak tracking is occurring.

In some implementations, baseband tracking channel 110 is implemented in at least one of an application specific integrated circuit (ASIC), a field programmable gate array (FPGA), a field programmable object array (FPOA), a programmable logic device (PLD), a digital signal processor (DSP) or a general purpose processor (GPP). The BOC switch can be implemented with a hardware adjustment or a software adjustment based on whether the integration is performed on a FPGA or ASIC, or whether the integration is performed on a DSP or a GPP.

Figure 4:
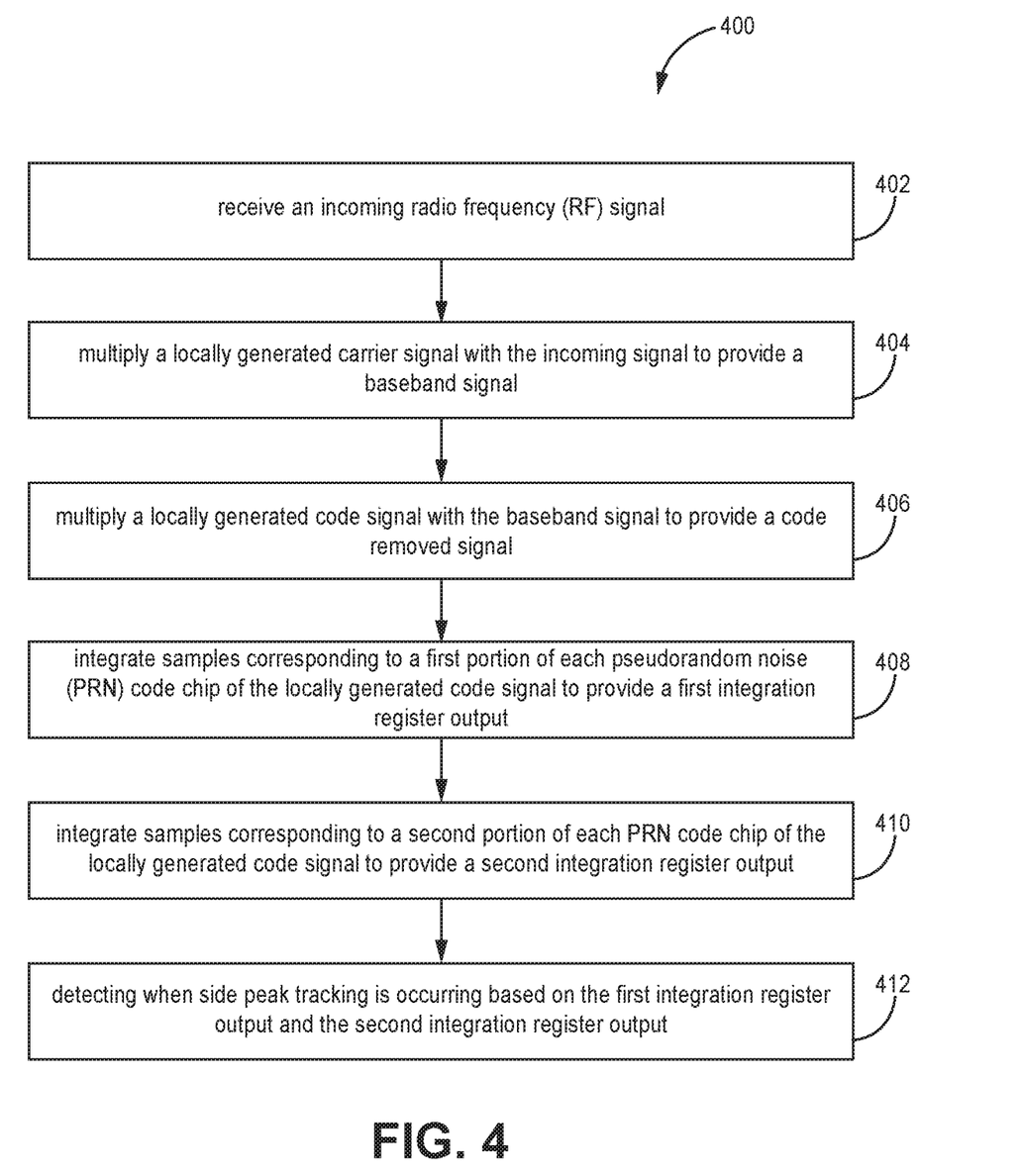
FIG. 4 is a flow diagram of an exemplary method for detecting side peak tracking by GNSS receiver according to one embodiment of the present disclosure.

FIG. 4 is a flow diagram of an example method 400 of detecting side peak tracking by a GNSS receiver, such as the GNSS receiver disclosed with respect to FIGS. 1-3. It should be understood that method 400 may be implemented in conjunction with any of the various embodiments and implementations described in this disclosure above or below. As such, elements of method 400 may be used in conjunction with, in combination with, or substituted for elements of those embodiments. Further, the functions, structures and other description of elements for such embodiments described herein may apply to like named elements of method 400 and vice versa.

Method 400 begins at block 402 with receiving at least one incoming radio frequency (RF) signal. The at least one incoming RF signal is digitized using a radio frequency front end (RF-FE), such as an RF-FE 150, into a digital samples. Method 400 proceeds to block 404 with multiplying a locally generated carrier signal with the incoming signal to provide a baseband signal, wherein the locally generated carrier signal is generated in a carrier generator, such as carrier generator 170, of a baseband tracking channel, such as baseband tracking channel 110 of the GNSS receiver.

Method 400 proceeds to block 406 with multiplying a locally generated code signal with the baseband signal to provide a code removed signal, wherein the locally generated code signal is generated in a code generator, such a code generator 140, of a baseband tracking channel, such as baseband tracking channel 110 of the GNSS receiver. The locally generated code signal is provided in a prompt correlator, such as a prompt correlator 120 of the baseband tracking channel. In one example of method 400, the locally generated signal is a BOC (1,1) modulated code signal which is multiplied with the baseband signal to provide a code removed signal.

Method 400 then proceeds to block 408 with integrating samples of code removed signal corresponding to the first portion of each chip of a pseudorandom noise code modulated with a BOC signal in a first integration register, such as integration register 122, of the baseband tracking channel to provide a first integration register output. Method 400 then proceeds to block 410 with integrating samples of code removed signal corresponding to the second portion of each chip of a pseudorandom noise code modulated with a BOC signal in a second integration register, such as integration register 124, of the baseband tracking channel to provide a second integration register output. In exemplary embodiments, first portion is a first half of each chip and second portion is the second half of each chip of the PRN code modulated with a BOC signal.

Finally, method 400 proceeds to block 412 with detecting when side peak tracking is occurring based on the first integration register output and the second integration register output. In one implementation, a side peak tracking detection module, such as side peak tracking detection module 130, is implemented to detect when side peak tracking is occurring.

In one implementation of method 400, detecting when side peak tracking is occurring further comprises subtracting the second integration register output from the first integration register output to provide a difference and determining the absolute value of the difference. When the absolute value of the subtraction result of the second integration register output from the first integration register output exceeds an amplitude threshold, this implementation of method 400 further comprises increasing a jump count by one. When the absolute value of the subtraction result of the second integration register output from the first integration register output does not exceed an amplitude threshold, this implementation of method 400 comprises decreasing the jump count by one. Finally, when the jump count is greater than or equal to a predefined number of times, this implementation of method 400 comprises generating information indicating that side peak tracking is occurring.

In a further implementation of method 400, detecting when side peak tracking is occurring further comprises shifting the code generator by an offset value consistent with a code offset between detected side peak and a main peak. In an even further implementation, shifting the code generator by an offset value further comprises shifting the code generator by a negative code offset value when the subtraction result is greater than or equal to zero and the absolute value of the difference exceeds the amplitude threshold by a predefined number of times, and shifting the code generator by a positive code offset value when the subtraction result is less than zero and the absolute value of the difference exceeds the amplitude threshold by a predefined number of times. In one implementation, shifting the code generator by an offset value further comprises shifting the code generator by a negative code offset value when the subtraction result is greater than or equal to zero by a value larger than a predetermined threshold and the absolute value of the difference exceeds the amplitude threshold by a predefined number of times, and shifting the code generator by a positive code offset value when the subtraction result is less than zero by a value larger than a predetermined threshold and the absolute value of the difference exceeds the amplitude threshold by a predefined number of times. In one implementation, the value of the code offset is 0.5 chips. Accordingly, in such an implementation, when the code generator is shifted by a negative code offset, the value of the code offset is −0.5 chips, and when the code generator is shifter by a positive code offset, the value of the code offset is +0.5 chips.

In one implementation of method 400, detecting when side peak tracking is occurring further comprises subtracting the second integration register output from the first integration register output to provide a difference, determining an absolute value of the difference, and generating information indicating that main peak tracking is occurring when the absolute value of the difference is less than or equal to an amplitude threshold, and wherein a jump count is less than a count threshold. The jump count is the number of time the absolute value of the difference has exceeded the amplitude threshold.

In an implementation, method 400 further comprises summing the first integration register output and the second integration register output to provide a prompt correlation result indicating the correlation between the locally generated code signal and the incoming RF signal. In one implementation, first integration register output and the second integration register output are summed via a summing node, such as summing node 180.

Figure 5:
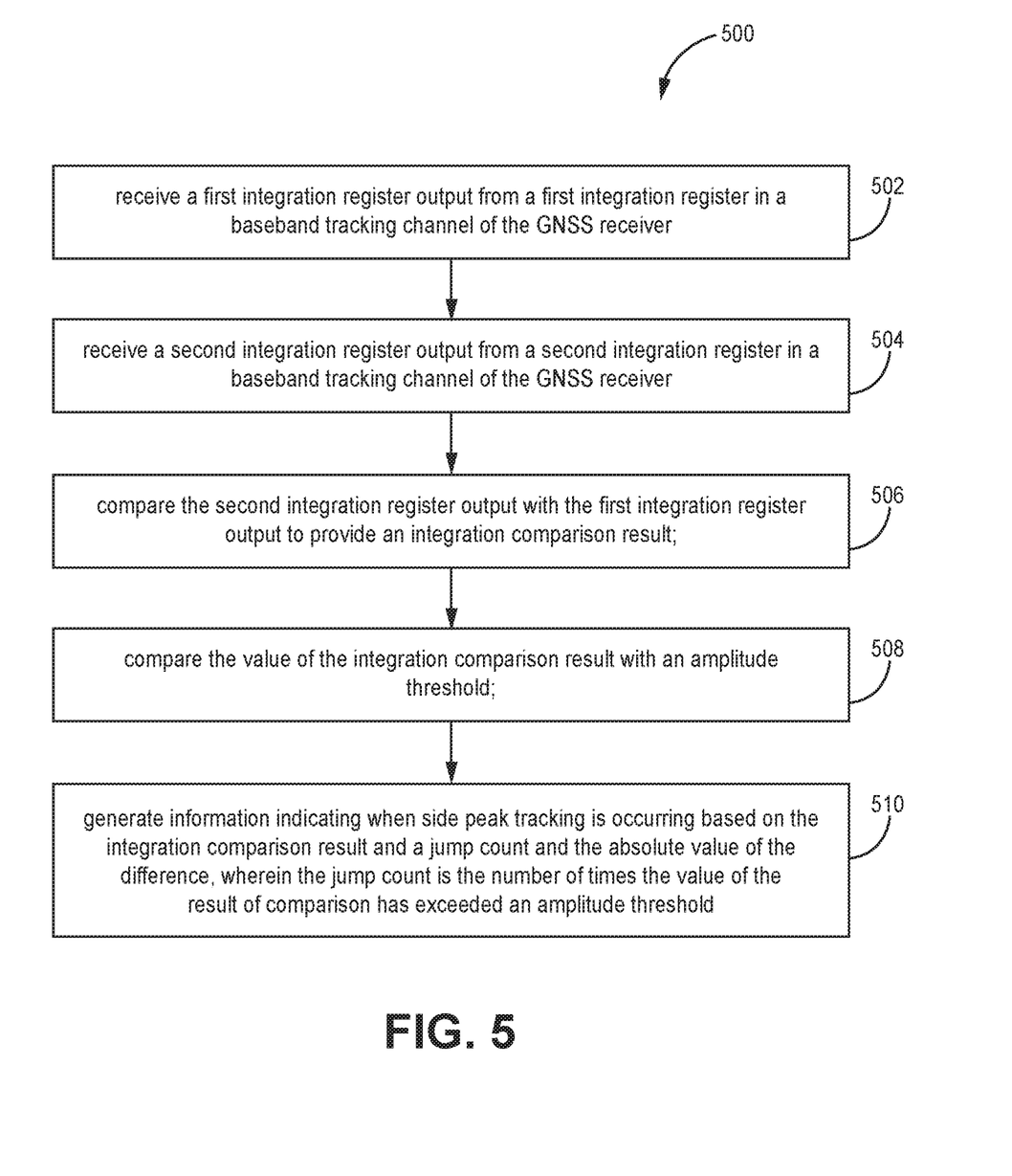
FIG. 5 is another flow diagram of an exemplary method for detecting side peak tracking by GNSS receiver according to one embodiment of the present disclosure.

FIG. 5 is a flow diagram of another example method 500 embodiment for detecting side peak tracking by a GNSS receiver, such as the GNSS receiver 100 as disclosed with respect to FIGS. 1-3. It should be understood that method 500 may be implemented in conjunction with any of the various embodiments and implementations described in this disclosure above or below. As such, elements of method 500 may be used in conjunction with, in combination with, or substituted for elements of those embodiments. Further, the functions, structures and other description of elements for such embodiments described herein may apply to like named elements of method 500 and vice versa.

Method 500 begins with block 502 with receiving a first integration register output from a first integration register, such a first integration register 122, in a baseband tracking channel, such as baseband channel 110 of the GNSS receiver, such as GNSS receiver 100. In one implementation of method 500, receiving a first integration register output from a first integration register further comprises receiving samples of code removed signal corresponding to a first half of each chip of a pseudorandom noise code modulated with a BOC signal.

Method 500 then proceeds to block 504 with receiving a second integration register output from a second integration register, such as second integration register 124, in the baseband tracking channel of the GNSS receiver. In one implementation of method 500, receiving a second integration register output from a second integration register further comprises receiving samples of a code removed signal corresponding to a second half of each chip of the pseudorandom noise code modulated with a BOC signal.

Method 500 then proceeds to block 506 with comparing the second integration register output with the first integration register output to provide an integration comparison result. In one example, comparing the second integration register output with the first integration register output to provide an integration comparison result further comprises subtracting the second integration register output from the first integration register output to provide a difference and determining an absolute value of the difference.

Method 500 then proceeds to block 508 with comparing the absolute value of the difference with an amplitude threshold. Finally, method 500 proceeds to block 510 with generating information indicating when side peak tracking is occurring based the integration comparison result and a jump count and the absolute value of the difference. The jump count is the number of times the absolute value of the integration comparison result (ex. the difference) has exceeded the amplitude threshold minus the number of times the integration comparison result has not exceeded the amplitude threshold. In an implementation of method 500, when the absolute value of the integration comparison result exceeds an amplitude threshold and the jump count is greater than or equal to a predefined count threshold, method 500 comprises generating information indicating that side peak tracking is occurring.

EXAMPLE EMBODIMENTS

Example 1 includes a global navigation satellite system (GNSS) receiver having at least one processor configured to implement at least one baseband tracking channel, the baseband tracking channel comprising: at least one code generator to generate a local signal correlating with an incoming signal received by the GNSS receiver; a multiplier that multiplies the local signal with a baseband signal corresponding to an incoming signal received by the GNSS receiver to generate a code removed signal; at least one prompt correlator including at least two integration registers, wherein a first of the at least two integration registers integrates the samples of the code removed signal corresponding to a first portion of each pseudorandom noise code chip of the local signal to provide a first integration register output, and wherein a second of the at least two integration registers integrates the samples of the code removed signal corresponding to a second portion of the PRN code chip of the local signal to provide a second integration register output; and a side peak tracking detection module that receives integration results from the at least first and second of the at least two integration registers and generates information indicating when side peak tracking is occurring based on the integration results from the at least first and second of the at least two integration registers.

Example 2 includes the GNSS receiver of Example 1, wherein the baseband tracking channel further comprises at least one carrier generator to generate a local carrier signal to multiply with the incoming signal.

Example 3 includes the GNSS receiver of any of Examples 1-2, wherein the baseband tracking channel further comprises a summing node that receives the first integration register output and the second integration register output, and wherein the summing node provides a prompt correlator result indicating the correlation between the local signal and the incoming signal.

Example 4 includes the GNSS receiver of any of Examples 1-3, wherein when absolute value of a subtraction result of the second integration register output from the first integration register output exceeds an amplitude threshold, the side peak tracking detection module increases a jump count by one, wherein when absolute value of a subtraction result of the second integration register output from the first integration register output does not exceed an amplitude threshold, the side peak tracking detection module decreases the jump count by one, and when the jump count is greater than or equal a predefined number of times, the side peak tracking detection module generates information indicating that side peak tracking is occurring.

Example 5 includes the GNSS receiver of Example 4, wherein the code generator is shifted by an offset value consistent with a code offset between detected side peak and a main peak.

Example 6 includes the GNSS receiver of Example 5, wherein when the jump count is greater than or equal to the predefined number of times and the subtraction result is greater than zero, the code generator is shifted by a negative code offset value, and wherein when the jump count is greater than or equal to the predefined number of times and the subtraction result is less than zero, the code generator is shifted by a positive code offset value.

Example 7 includes the GNSS receiver of any of Examples 1-6, wherein the value of the code offset is positive or negative 0.5 chips.

Example 8 includes the GNSS receiver of any of Examples 1-7, wherein the first of the at least two integration registers integrates the samples of the code removed signal corresponding to a first half of a pseudorandom noise code chip of the local signal to provide a first integration register output, and wherein a second of the at least two integration registers integrates the samples of the code removed signal corresponding to a second half of the PRN code chip of the local signal to provide a second integration register output.

Example 9 includes the GNSS receiver of any of Examples 1-8, wherein the baseband tracking channel is implemented in at least one of an application specific integrated circuit (ASIC), a field programmable gate array (FPGA), a digital signal processor (DSP) and a general purpose processor (GPP).

Example 10 includes a method of detecting side peak tracking by a GNSS receiver, the method comprising: receiving an incoming radio frequency (RF) signal; multiplying a locally generated carrier signal with the incoming signal to provide a baseband signal; multiplying a locally generated code signal with the baseband signal to provide a code removed signal; integrating samples corresponding to a first portion of each pseudorandom noise code chip of the locally generated code signal to provide a first integration register output; integrating samples corresponding to a second portion of each PRN code chip of the locally generated code signal to provide a second integration register output; and detecting when side peak tracking is occurring based on the first integration register output and the second integration register output.

Example 11 includes the method of Example 10, wherein integrating samples corresponding to a first portion of each pseudorandom noise code chip of the locally generated code signal further comprises integrating samples corresponding to the first portion of each PRN code chip of the locally generated code signal in a first integration register of the baseband tracking channel; and integrating samples corresponding to a second portion of each PRN code chip of the locally generated code signal further comprises integrating samples corresponding to the second portion of each PRN code chip of the locally generated code signal in a second integration register of the baseband tracking channel different from the first integration register.

Example 12 includes the method of any of Examples 10-11, further comprising summing the first integration register output and the second integration register output to provide a prompt correlation result indicating the correlation between the locally generated code signal and the incoming RF signal.

Example 13 includes the method of any of Examples 10-12, wherein detecting when side peak tracking is occurring further comprises: subtracting the second integration register output from the first integration register output to provide a difference; determining the absolute value of the difference; when the absolute value of the subtraction result of the second integration register output from the first integration register output exceeds an amplitude threshold, increasing a jump count by one; when the absolute value of the subtraction result of the second integration register output from the first integration register output does not exceed an amplitude threshold, decreasing the jump count by one; and when the jump count is greater than or equal to a predefined number of times, generating information indicating that side peak tracking is occurring.

Example 14 includes the method of Example 13, further comprising shifting the code generator by an offset value consistent with a code offset between detected side peak and a main peak.

Example 15 includes the method of Example 14, wherein shifting the code generator by an offset value further comprises: when the subtraction result is greater than zero and the jump count is greater than or equal to the predefined number of times, shifting the code generator by a negative code offset value; and when the subtraction result is less than zero and the jump count is greater than or equal to the predefined number of times, shifting the code generator by a positive code offset value.

Example 16 includes the method of any of Examples 14-15, wherein shifting the code generator by an offset value is shifting the code generator by a value of positive or negative 0.5 chips.

Example 17 includes the method of any of Examples 10-16, wherein integrating samples corresponding to a first portion of each pseudorandom noise code chip of the locally generated code signal further comprises integrating samples corresponding to a first half of the PRN code chip of the locally generated code signal to provide a first integration register output; and integrating samples corresponding to a second portion of each pseudorandom noise code chip of the locally generated code signal further comprises integrating samples corresponding to a second half of the PRN code chip of the locally generated code signal to provide a second integration register output.

Example 18 includes a global navigation satellite system (GNSS) receiver having at least one processor configured to implement at least one baseband tracking channel, the baseband tracking channel comprising: at least one code generator to generate a local signal correlating with an incoming signal received by the GNSS receiver; a multiplier that multiplies the local signal with a baseband signal corresponding to an incoming signal received by the GNSS receiver to generate a code removed signal; at least one prompt correlator including at least one integration register, wherein the at least one integration register integrates the samples of the code removed signal corresponding to a first portion of each pseudorandom noise code chip of the code removed signal to provide a first integration register output, and wherein the at least one integration register integrates the samples of the code removed signal corresponding to a second portion of each PRN code chip of the code removed signal to provide a second integration register output; and a side peak tracking detection module that receives integration results from the at least one integration register and generates information indicating when side peak tracking is occurring based on the first integration register output and the second integration register output.

Example 19 includes the receiver of Example 18, wherein the at least one prompt correlator includes at least two integration registers, wherein the first of the at least two integration registers integrates the samples of the code removed signal corresponding to the first portion of a PRN code chip of the local signal to provide a first integration register output, and wherein the second integration register integrates the samples of the code removed signal corresponding to a second portion of the PRN code chip of the local signal to provide a second integration register output.

Example 20 includes the receiver of any of Examples 18-19, wherein when absolute value of a subtraction result of the second integration register output from the first integration register output exceeds an amplitude threshold the side peak tracking detection module increases a jump count by one, wherein when absolute value of a subtraction result of the second integration register output from the first integration register output does not exceed an amplitude threshold, the side peak tracking detection module decreases the jump count by one, and when the jump count is greater than or equal to a predefined number of times, the side peak tracking detection module generates information indicating that side peak tracking is occurring.

In various alternative embodiments, system elements, method steps, or examples described throughout this disclosure (such as the baseband tracking channel, prompt correlator, side peak tracking modulator, and/or sub-parts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A global navigation satellite system (GNSS) receiver having at least one processor executing code to implement at least one baseband tracking channel, the baseband tracking channel comprising:
   at least one code generator to generate a local signal correlating with an incoming signal received by the GNSS receiver, the local signal comprising a local pseudorandom noise (PRN) code modulated with a BOC chip signal;
   a multiplier that multiplies the local signal with a baseband signal corresponding to an incoming signal received by the GNSS receiver to generate samples of a code removed signal;
   at least one prompt correlator including at least two integration registers, wherein a first of the at least two integration registers integrates the samples of the code removed signal corresponding to a first portion of each pseudorandom noise (PRN) code chip of the local signal to provide a first integration register output, and wherein a second of the at least two integration registers integrates the samples of the code removed signal corresponding to a second portion of the PRN code chip of the local signal to provide a second integration register output; and a side peak tracking detection module that receives integration results comprising the first integration register output and the second integration register output and generates information indicating when side peak tracking is occurring based on an absolute value of a difference between the first integration register output and the second integration register output.

2. The GNSS receiver of claim 1, wherein the baseband tracking channel further comprises at least one carrier generator to generate a local carrier signal to multiply with the incoming signal.

3. The GNSS receiver of claim 1, wherein the baseband tracking channel further comprises a summing node that receives the first integration register output and the second integration register output, and wherein the summing node provides a prompt correlator result indicating the correlation between the local signal and the incoming signal.

4. The GNSS receiver of claim 1, wherein the side peak tracking detection module is configured to determine when an absolute value of a subtraction result comprising a difference between the first integration register output and the second integration register output exceeds an amplitude threshold;
wherein when the absolute value of a subtraction result comprising the difference between the first integration register output and the second integration register output exceeds the amplitude threshold, the side peak tracking detection module increases a value of a jump count by one, wherein when the absolute value of the subtraction result does not exceed the amplitude threshold, the side peak tracking detection module decreases the value of the jump count by one;
wherein when the jump count is greater than or equal to a count threshold, the side peak tracking detection module generates the information indicating that side peak tracking is occurring.

5. The GNSS receiver of claim 4, wherein the code generator is coupled to the side peak detection module, wherein the code generator is shifted by an offset value consistent with a code offset between a detected side peak and a main peak.

6. The GNSS receiver of claim 5, wherein when the value of the jump count is greater than or equal to the count threshold and the subtraction result is greater than zero, the side peak detection module shifts the code generator by a negative code offset value, and wherein when the value of the jump count is greater than or equal to the count threshold and the subtraction result is less than zero, the side peak detection module shifts the code generator by a positive code offset value.

7. The GNSS receiver of claim 5, wherein the value of the code offset is positive or negative 0.5 chips.

8. The GNSS receiver of claim 1, wherein the first of the at least two integration registers is configured to integrates the samples of the code removed signal corresponding to a first half of each pseudorandom noise code chip of the local signal to provide a first integration register output, and wherein a second of the at least two integration registers is configured to integrates the samples of the code removed signal corresponding to a second half of each PRN code chip of the local signal to provide a second integration register output.

9. The GNSS receiver of claim 1, wherein the baseband tracking channel is implemented in at least one of an application specific integrated circuit (ASIC), a field programmable gate array (FPGA), a digital signal processor (DSP) and a general purpose processor (GPP).

10. A method of detecting side peak tracking by a GNSS receiver comprising a prompt correlator, the method comprising:
receiving an incoming signal;
generating a locally generated code signal comprising a local pseudorandom noise (PRN) code modulated with a BOC chip signal;
multiplying a locally generated carrier signal with the incoming signal to provide a baseband signal;
multiplying the locally generated code signal with the baseband signal to provide samples of a code removed signal;
integrating samples of the code removed signal corresponding to a first portion of each pseudorandom noise code chip of the locally generated code signal to provide a first integration register output;
integrating samples of the code removed signal corresponding to a second portion of each PRN code chip of the locally generated code signal to provide a second integration register output; and
detecting when side peak tracking is occurring based on an absolute value of a difference between the first integration register output and the second integration register output;
preventing the GNSS receiver from locking to side peak tracking by adjusting an offset of the prompt correlator in response to detecting when side peak tracking is occurring.

11. The method of claim 10, wherein
integrating samples corresponding to a first portion of each pseudorandom noise code chip of the locally generated code signal further comprises integrating samples corresponding to the first portion of each PRN code chip of the locally generated code signal in a first integration register of the baseband tracking channel; and
integrating samples corresponding to a second portion of each PRN code chip of the locally generated code signal further comprises integrating samples corresponding to the second portion of each PRN code chip of the locally generated code signal in a second integration register of the baseband tracking channel different from the first integration register.

12. The method of claim 10, further comprising summing the first integration register output and the second integration register output to provide a prompt correlation result indicating the correlation between the locally generated code signal and the incoming signal.

13. The method of claim 10, wherein detecting when side peak tracking is occurring further comprises:
subtracting the second integration register output from the first integration register output to provide a subtraction result;
determining the absolute value of the subtraction result;
when the absolute value of the subtraction result of the second integration register output from the first integration register output exceeds an amplitude threshold, increasing a jump count by one;
when the absolute value of the subtraction result of the second integration register output from the first integration register output does not exceed an amplitude threshold, decreasing the jump count by one; and
when the jump count is greater than or equal to a count threshold, generating information indicating that side peak tracking is occurring.

14. The method of claim 13, wherein preventing the GNSS receiver from locking to side peak tracking by adjusting the offset of the prompt correlator comprises shifting the code generator by an offset value consistent with a code offset between detected side peak and a main peak.

15. The method of claim 14, wherein shifting the code generator by an offset value further comprises:
    when the subtraction result is greater than zero and the jump count is greater than or equal to the count threshold, shifting the code generator by a negative code offset value; and
    when the subtraction result is less than zero and the jump count is greater than or equal to the count threshold, shifting the code generator by a positive code offset value.

16. The method of claim 14, wherein shifting the code generator by an offset value is shifting the code generator by a value of positive or negative 0.5 chips.

17. The method of claim 10, wherein integrating samples corresponding to a first portion of each pseudorandom noise code chip of the locally generated code signal further comprises integrating samples corresponding to a first half of the PRN code chip of the locally generated code signal to provide a first integration register output; and
    wherein integrating samples corresponding to a second portion of each pseudorandom noise code chip of the locally generated code signal further comprises integrating samples corresponding to a second half of the PRN code chip of the locally generated code signal to provide a second integration register output.

18. A global navigation satellite system (GNSS) receiver having at least one processor executing code to implement at least one baseband tracking channel, the baseband tracking channel comprising:
    at least one code generator to generate a local signal correlating with an incoming signal received by the GNSS receiver;
    a multiplier that multiplies the local signal with a baseband signal corresponding to an incoming signal received by the GNSS receiver to generate samples of a code removed signal, the local signal comprising a local pseudorandom noise (PRN) code modulated with a BOC chip signal;
    at least one prompt correlator including at least one integration register, wherein the at least one integration register integrates the samples of the code removed signal corresponding to a first portion of each pseudorandom noise code chip of the code removed signal to provide a first integration register output, wherein the at least one integration register integrates the samples of the code removed signal corresponding to a second portion of each PRN code chip of the code removed signal to provide a second integration register output, and wherein the at least one integration register integrates in an additive mode for the first portion and integrates in a subtractive mode for the second portion, wherein the at least one integration register is configured to be switched between the additive mode and the subtractive mode based on which portion of the PRN code chip that samples being integrated correspond to; and
    a side peak tracking detection module that receives integration results comprising the first integration register output and the second integration register output and generates information indicating when side peak tracking is occurring based on an absolute value of a difference between the first integration register output and the second integration register output.

19. The GNSS receiver of claim 18, wherein the at least one prompt correlator includes at least two integration registers, wherein the first of the at least two integration registers integrates the samples of the code removed signal corresponding to the first portion of a PRN code chip of the local signal to provide a first integration register output, and wherein the second integration register integrates the samples of the code removed signal corresponding to a second portion of the PRN code chip of the local signal to provide a second integration register output.

20. The GNSS receiver of claim 19, wherein when an absolute value of a subtraction result comprising a difference between the first integration register output and the second integration register output exceeds an amplitude threshold, the side peak tracking detection module increases a value of a jump count by one;
    herein when absolute value of a subtraction result of the second integration register output from the first integration register output does not exceed an amplitude threshold, the side peak tracking detection module decreases the value of the jump count by one; and
    wherein when the value of the jump count is greater than or equal to a count threshold, the side peak tracking detection module generates information indicating that side peak tracking is occurring.

* * * * *